(12) United States Patent
Day et al.

(10) Patent No.: US 7,877,732 B2
(45) Date of Patent: Jan. 25, 2011

(54) EFFICIENT STRESS TESTING OF A SERVICE ORIENTED ARCHITECTURE BASED APPLICATION

(75) Inventors: Philip Arthur Day, Toronto (CA); Young Wook Lee, North York (CA); Kyle D. Robeson, North York (CA)

(73) Assignee: International Business Machines Corporation, Armonk, NY (US)

( * ) Notice: Subject to any disclaimer, the term of this patent is extended or adjusted under 35 U.S.C. 154(b) by 1092 days.

(21) Appl. No.: 11/564,417

(22) Filed: Nov. 29, 2006

(65) Prior Publication Data

US 2008/0126390 A1     May 29, 2008

(51) Int. Cl.
*G06F 9/44* (2006.01)
(52) U.S. Cl. .................. 717/124; 717/101; 717/102; 717/125; 717/136
(58) Field of Classification Search .............. 717/124
See application file for complete search history.

(56) References Cited

U.S. PATENT DOCUMENTS

| | | | | |
|---|---|---|---|---|
| 6,002,869 | A * | 12/1999 | Hinckley | 717/124 |
| 6,163,805 | A * | 12/2000 | Silva et al. | 709/227 |
| 6,601,233 | B1 * | 7/2003 | Underwood | 717/102 |
| 6,859,922 | B1 * | 2/2005 | Baker et al. | 717/125 |
| 2002/0083213 | A1 * | 6/2002 | Oberstein et al. | 709/313 |
| 2005/0060317 | A1 * | 3/2005 | Lott et al. | 707/10 |
| 2005/0120276 | A1 * | 6/2005 | Kolawa et al. | 714/38 |
| 2005/0144529 | A1 * | 6/2005 | Gotz et al. | 714/38 |
| 2005/0228828 | A1 * | 10/2005 | Chandrasekar et al. | 707/104.1 |
| 2006/0129992 | A1 | 6/2006 | Oberholtzer et al. | |
| 2006/0150026 | A1 | 7/2006 | Kolawa et al. | |
| 2006/0242466 | A1 * | 10/2006 | Tillmann et al. | 714/38 |
| 2007/0088668 | A1 * | 4/2007 | Larab et al. | 707/1 |
| 2007/0089091 | A1 * | 4/2007 | Larab et al. | 717/124 |
| 2007/0220341 | A1 | 9/2007 | Apostoloiu et al. | |

OTHER PUBLICATIONS

Tsai et al., "Cooperative and Group Testing in Verification of Dynamic Composite Web Services", Proceedings—International Computer Software and Applications conference, v 2, Workshop Papers and Fast Abstracts, COMPSAC 2004, 2004, pp. 170-173.

* cited by examiner

*Primary Examiner*—Thomas K Pham
(74) *Attorney, Agent, or Firm*—Yee & Associates, P.C.; Justin M. Dillon

(57) ABSTRACT

A method for efficiently stress testing a service oriented architecture based application. A business process flow is recorded between a client and a server. When an XML document is extracted from the recorded business process flow, an XML document file is created for the extracted XML document, an XML document descriptor file is created comprising XPath queries for data elements in the XML document file, a configuration file is created comprising user input parameters obtained from the recorded business process flow, and test input data file is created. The user input parameters in the configuration file are used to generate a test script to test the service oriented architecture based application, wherein data values from the test input data file are inserted into a template of the XML document file at locations specified by the XPath queries in the XML document descriptor file. The test script is then executed.

20 Claims, 4 Drawing Sheets

EFFICIENT STRESS TESTING OF A SERVICE ORIENTED ARCHITECTURE BASED APPLICATION

BACKGROUND OF THE INVENTION

1. Field of the Invention

The present invention relates generally to an improved application testing environment, and in particular to a computer implemented method, data processing system, and computer program product for efficiently stress testing a service oriented architecture based application.

2. Description of the Related Art

As the use of computer technology becomes more prevalent, businesses are increasingly seeking computer applications which address their business needs. These computer applications must be tested prior to implementation, however, to ensure that an application will execute as desired. Applications may be tested using "test cases", a test case being a sequence of steps that are required to perform a certain action within the application under test. The results of these test cases are then analyzed and evaluated. As many applications are quite complex, several, sometimes hundreds, of test cases are used for the testing of a single application. As test cases must be executed repeatedly throughout the development cycle, they are usually automated in a scripting or programming language to create a "test script".

For example, a test case may comprise a situation where a database application is tested to determine whether data can be added to the database. A test script is created to implement the test case. The test script may include several steps, instructions, or processes to test this aspect of the application, such as, for example, gaining access to update the database, transmitting the update request; receiving confirmation that the update request has been executed, reading from the database to determine if the data in the update request was stored successfully, and then logging off from the database. Execution of the test script generates an output which indicates whether the application successfully or unsuccessfully performed the test case.

Most performance testing tools are command-based, meaning that they record the requests sent to the system and at test execution time, modify and resend these same requests without any interaction with the client interface. Common command-based testing tools include Rational® Performance Tester (RPT), a product of International Business Machines Corporation, and SilkPerformer®, a product of Borland Software Corporation. However, Service Oriented Architecture (SOA) based applications such as those which send Business Object Documents (BOD) have special requirements for testing. Service Oriented Architecture describes a collection of services that communicate with each other over a network in order to carry out business processes. Communication in an SOA based system may involve either the simple passing of data or it may involve two or more services that coordinate some activity. These services will be loosely coupled. A business object document is an open standard for a message architecture developed by the Open Applications Group Integration Specification (OAGIS) group. Business object documents are used to specify business operations and transfer data among applications, such as exchanging messages between a client and server. The business object document contains the business content and is independent of the communication mechanism.

In a service oriented architecture system, business object documents may be used to communicate requests to a business service or to specify that the business service take some action. The business object document sent to the business service indicates the action to be executed, along with the ancillary data required to perform the action. Within performance test tooling, the business object document request is usually composed as a string and is sent to the business service as part of a service oriented architecture request. However, when an application which performs a business service is under test, the test script to be applied to the application is required to comprise completed business object documents which, as previously mentioned, describe the action to be performed, including all ancillary data needed to perform the action, before the test script may be sent to the server for processing. Thus, a test script generated using existing methods is required to comprise the complete content of a business object document before the test script may be properly executed. As some business object documents are large and complicated, test scripts generated from such documents may become similarly large and as complex. In addition, when a business object document is used in a test script, the test script must know the format of the particular business object document, thereby allowing the test script to know where the test data should be inserted during test execution. Furthermore, as development on a system under test continues, changes to the business object document will typically occur. These changes need to be represented in the test script with minimal effort.

SUMMARY OF THE INVENTION

The illustrative embodiments provide a computer implemented method, data processing system, and computer program product for efficiently stress testing a service oriented architecture based application. Here we assume that the system under test communicates through an eXtensible Markup Language (XML) based communication layer. Use of an XML based communication layer means that the messages passed to and from the system under test are contained in XML and are independent of the underlying communication layers such as TCP/IP. A business process flow is recorded using the system under test. When an XML document is sent to or from the system under test, the document is captured. For each XML document captured, an XML document file is created for the extracted XML document, an XML document descriptor file is also created comprised of XPath queries for data elements in the XML document file, a configuration file is created comprising user input parameters obtained from the recorded business process flow, and test input data file. The user input parameters in the configuration file are used to generate a test script to test the service oriented architecture based application, data values from the test input data file are inserted into a template of the XML document file at locations specified by the XPath queries in the XML document descriptor file. The test script is then executed.

BRIEF DESCRIPTION OF THE DRAWINGS

The novel features believed characteristic of the invention are set forth in the appended claims. The invention, a preferred mode of use, further objectives and advantages thereof will all be best understood by reference to the following detailed description of an illustrative embodiment when read in conjunction with the accompanying drawings, wherein:

DETAILED DESCRIPTION OF THE PREFERRED EMBODIMENT

Figure 1:
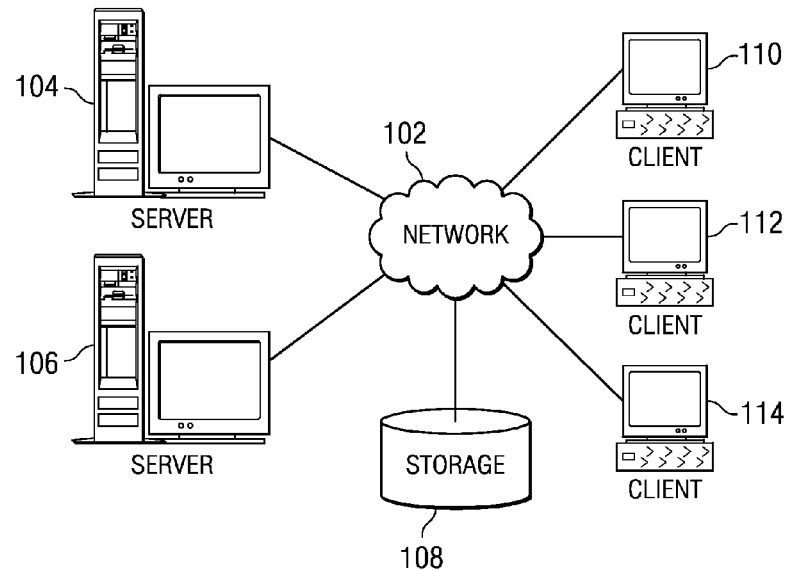
FIG. 1 depicts a pictorial representation of a distributed data processing system in which the illustrative embodiments may be implemented.
Figure 2:
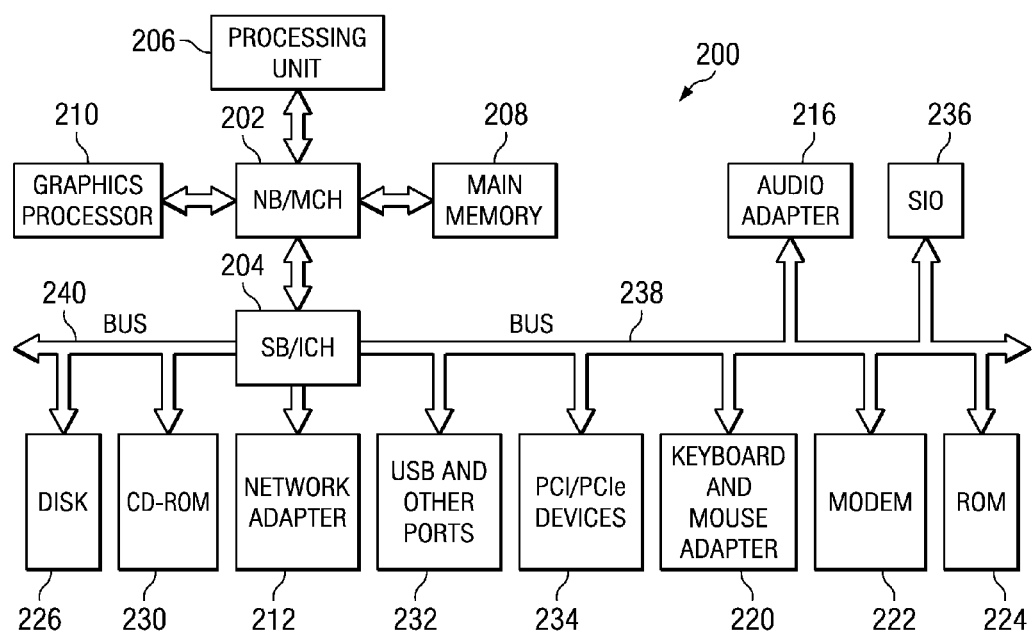
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a mechanism for stress testing a service oriented architecture based application. A service oriented architecture includes applications, business services, business functions, and data repositories for developing and deploying human resources or other applications. Applications correspond to a set of processes, and access business functions within business services. The business functions provide mechanisms for accessing and processing data. Business object documents may be used in a service oriented architecture to communicate requests to a business service or to specify that the business service take some action. A business object document sent to the business service may indicate the action to be executed, along with the ancillary data required to perform the action.

The illustrative embodiments provide an improvement over existing test environments which require that before a test script may be sent to an SOA server for processing, the test script must comprise complete business object documents describing the actions to be performed and all test data needed to perform the actions. The illustrative embodiments provide a testing environment in which business object document files, business object document descriptor files, and test data input files are created external to or separate from the test scripts used to test the performance of an application. A business object document descriptor file comprises XPath queries for each element in a corresponding business object document file. Functions external to the test scripts exist which take a data value, which may also be a complex data type in XML, and insert it at the location indicated by the specified XPath query. A test script uses these functions in conjunction with the descriptor file to take values from a data pool or any test data and insert it into the correct location in a given business object document.

The testing environment in the illustrative embodiments provide advantages over existing test methods, especially in dynamic SOA environments in which changes frequently occur. In such a dynamic environment, when changes to the business object documents occur, the test scripts often do not need to be calibrated for these changes. Instead, since the business object documents are externalized from the test scripts, only the business object documents and the XPath queries in the business object document descriptors would need to be updated if changes occur. Also, the test data insertion points within the business object documents are stored externally from the test script, such that the descriptor file may not require any changes at all if the business object document changes. Thus, changes to the business object documents and the test input data files may be represented in the test script with minimal effort. In addition, by externalizing the test input data files which are used to run the test scripts, the test input data files may be easily changed for each of several test runs in order to run different tests with the same test script, business object document files, and business object document descriptor files.

Figure 3:
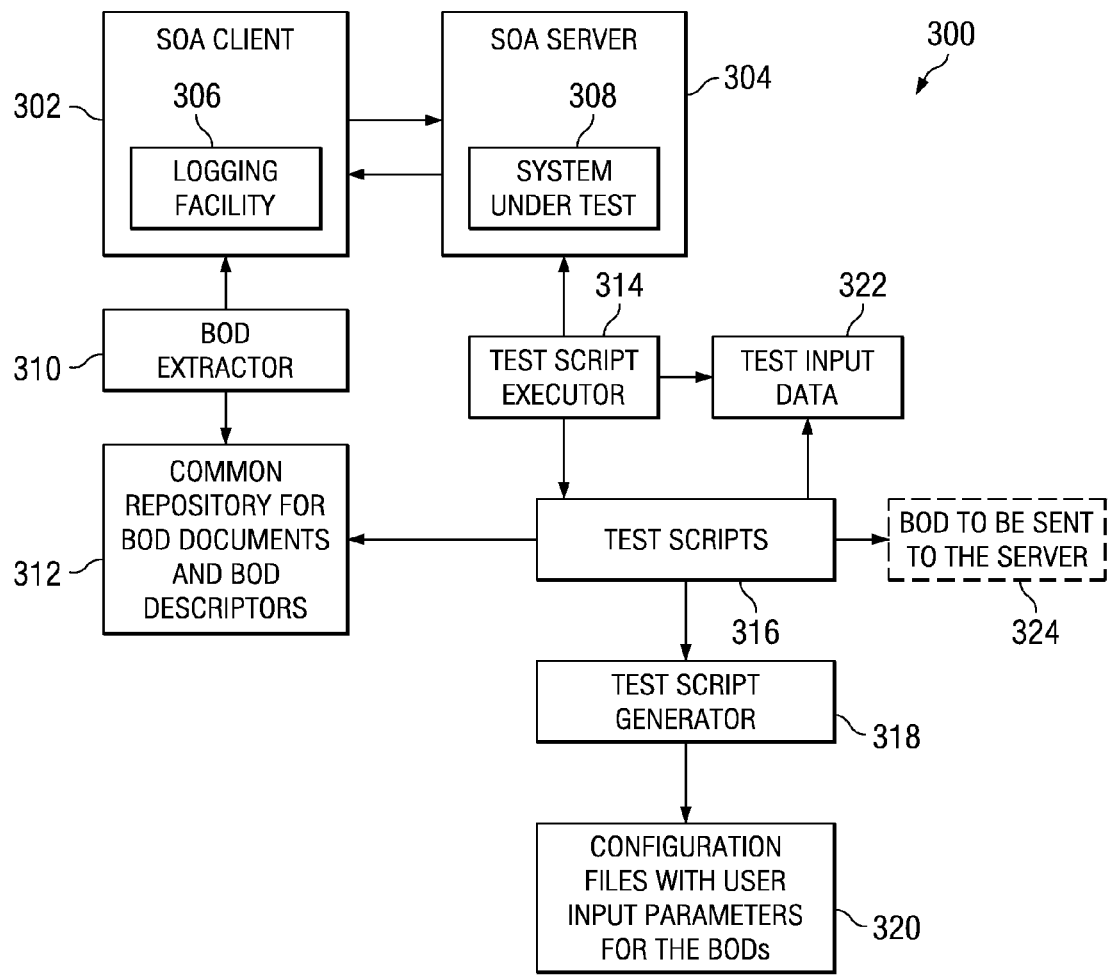
FIG. 3 is a block diagram of exemplary components with which the illustrative embodiments may be implemented.

FIG. 3 is a block diagram of exemplary components in a testing environment with which the illustrative embodiments may be implemented. Testing environment 300 may be implemented in a data processing system such as data processing system 100 in FIG. 1.

Testing environment 300 includes an SOA client 302 and an SOA server 304. SOA client 302 is an example client, such as clients 110, 112, or 114 in FIG. 1. SOA client 302 comprises logging facility 306. SOA server 304 is an example server, such as server 104 or 106 in FIG. 1. SOA client 302 may request a business service from SOA server 304 by sending a business object document containing a request for information or an action to be taken to SOA server 304. When a web service within SOA server 304 receives the business object document, the web service processes the request and sends a response to SOA client 302.

In this illustrative example, SOA server 304 comprises an application system under test 308. The first phase of testing application system under test 308 is the recording phase. In the recording phase, SOA client 302 manually performs various test cases against SOA server 304. A test case may comprise a set of test data, test programs (test scripts), and their expected results. In this example, the test cases comprise interactions a user may have with the application under test. For instance, in an online shopping application, SOA client 302 may manually create a customer identity, and then add a product to the customer's shopping cart. SOA client 302 may send the add request to SOA server 304 using a business object document, which contains the add request and the customer identity. SOA server 304 may in turn send a business object document containing the response to the add request. When the test scenarios are run, logging facility 306 within SOA client 302 logs all of the business object documents passed between the client and server to a temporary location within logging facility 306.

Business object document extractor tool 310 may be located within SOA client 302. Business object document extractor tool 310 comprises program code for creating a separate file for each business object document passed between SOA client 302 and SOA server 304. Business object document extractor tool 310 also generates a corresponding business object document descriptor file for each business object document. The program code stores these files in common repository 312. For example, if SOA client 302 sends two business object documents to SOA server 304 (e.g., one for creating the customer identity and one for adding a product to the customer's shopping cart), two business object document files with corresponding descriptor files (a total of four files) will be stored in common repository 312. An example of common repository 312 is a common file server. Common repository 312 may be located on a dedicated machine (i.e., other than SOA client 302 and SOA client server 304) between different testers.

After the recording phase is complete, the second phase of testing an application on SOA server 304, or execution phase, begins. In the execution phase, test script executor 314, which may be located on SOA client 302, selects test scripts 316 stored within a test script repository on SOA server 304 to run against the application under test. When a test script is executed, the test script may instruct test script generator 318 to generate the test script executor-specific code for the test case. Test script generator 318 is a program which generates files based on certain input information at runtime during execution. Test script generator 318 is responsible for taking in data from configuration file 320 and generating the test script executor-specific code. Configuration files 320 contains information regarding which business object document file to use for the test, as well user input parameters which map to values in test input data files 322. Configuration files 320 may be stored in common repository 312. Test input data files 322 contain the appropriate test data for driving the selected test scripts. At the time of execution, the test script executor-specific code "picks up" the proper business object document file from common repository 312, and fills it in with the test data from test input data files 322.

Consider, for example, a situation where a tester wants to test whether an application can create multiple users. The tester then needs to use a "CreateUser" business object document to create the multiple users. Although this business object document may contain many attributes and values, the tester is not concerned about meta data or client-generated system data. The tester is only interested in user input such as "userId" and "userPassword". These user input parameters may be placed into configuration files 320, and the actual user input is placed into test input data files 322. Taking the configuration files, test script generator 318 generates the test script executor-specific code that retrieves the proper template "CreateUser" business object document from common repository 312 and fills it in with the test data from test input data files 322 at runtime during execution.

Thus, once the business object document file and the configuration file have been created externally, test script executor 314 may select the appropriate test scripts to test the application by calling test script generator 318. Test script generator 318 retrieves the business object document file specified in the test script from common repository 312. The business object document file may be referred to as a template file, since various inputs from the test input data files 322 will be used to populate the template business object document file. Test script generator 318 also retrieves the corresponding test data values for the business object document file from test input data files 322 associated with the test script. Using the business object document descriptor corresponding to the template business object document file specified in the test script, test script generator 318 inserts values from test input data files 322 into the corresponding elements in the template business object document file. For example, test script generator 318 retrieves a template business object document file specified in a test script from common repository 312. Test script generator 318 uses the corresponding business object document descriptor file to fill in the user ID information in the elements in the template business object document file with the user ID information specified in the test input file, and generate a populated business object document file 324 for testing.

When the populated business object document file has been generated, test script executor 314 sends populated business object document file 324 to SOA server 304 to process the test script. For instance, test script executor 314 may send the populated business object document file to SOA server 304 to create users with different IDs, as specified in the configuration file.

It should be noted that an important benefit of the testing environment in FIG. 3 is that in a dynamic SOA environment, changes occur constantly, but with the illustrative embodiments, testers do not need to calibrate test scripts for these changes. Testers would only need to repeat the steps in the recording phase for business object documents that have changed in order to put the latest version into common repository 312. Thus, changes to the business object documents may be represented in the test script with minimal effort.

Another advantage of the testing environment in FIG. 3 is that other users may create different test scripts which send the same business object document but which use different test inputs. In this way, the business object document file and business object document descriptor file may be reused across tests. While it is possible to share configuration files, it is generally not a good practice as it creates unwanted dependencies. The test script determines which business object documents are sent in which order and with which test inputs. In addition, the test script may be used to do extra processing on requests and validate the responses received from the system under test.

Furthermore, business object documents are XML based documents which conform to a business object document standard. Thus, while the examples above employ the use of business object documents in particular to demonstrate the features of the illustrative embodiments, the same process in the illustrative embodiments may be used on any XML based standard.

Figure 4:
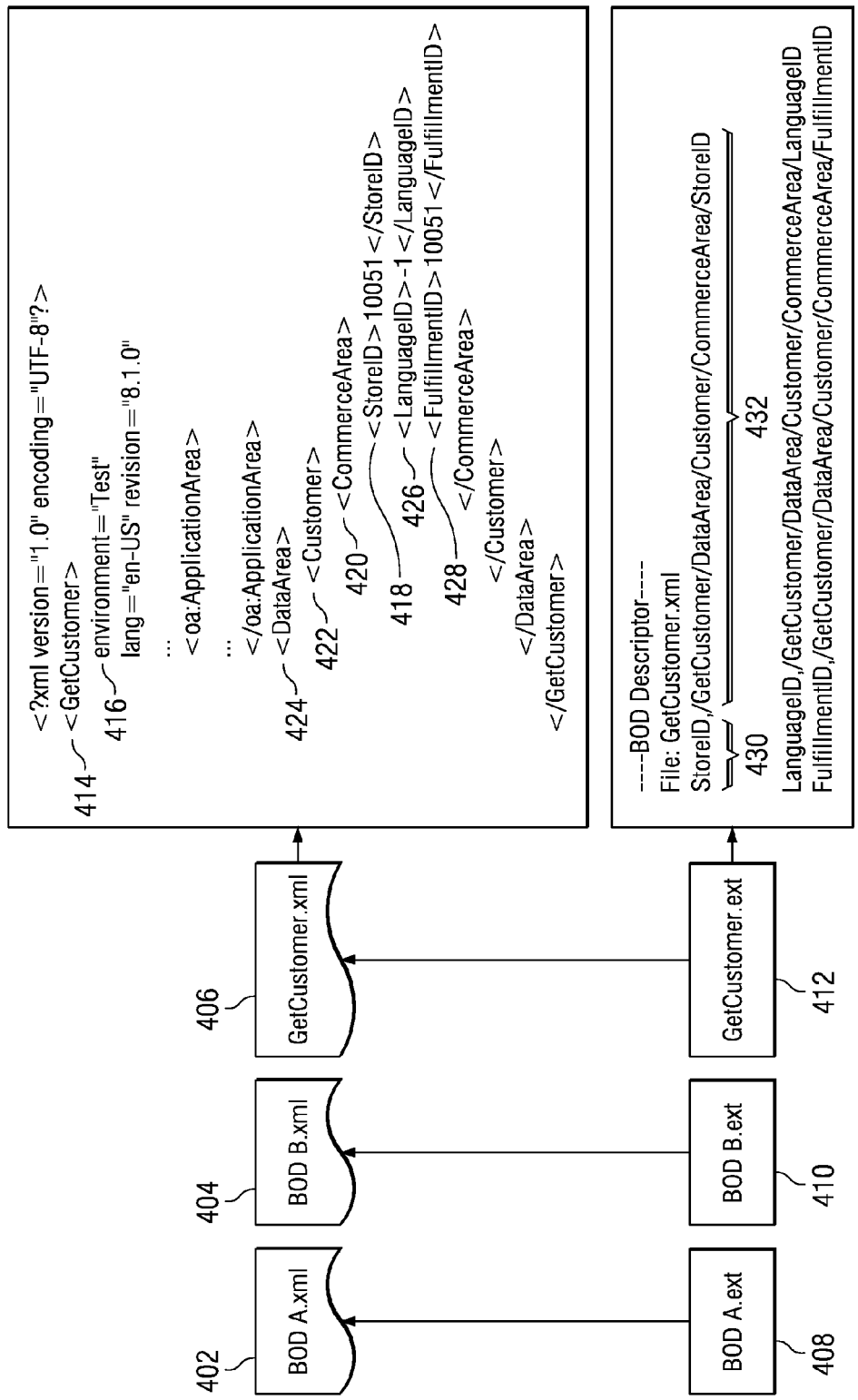
FIG. 4 is an example of business object documents and business object document descriptors in accordance with the illustrative embodiments.

FIG. 4 is an example of business object documents and business object documents descriptors in accordance with the illustrative embodiments. In this illustrative example, three business object documents, BOD A.xml 402, BOD B.xml 404, and GetCustomer.xml 406, and corresponding business object document descriptors BOD A.ext 408, BOD B.ext 410, and GetCustomer.ext 412, have been created by business object document extractor tool 310 and are stored in common repository 312 in FIG. 3. Information within a business object document, such as GetCustomer.xml 406 is represented in XML. GetCustomer data element 414 is shown to specify a test environment 416. StoreId 418 specifies the store ID (e.g., 10051) within commerce area data element 420, customer data element 422, and data area data element 424. Likewise, languageId 426 and fulfillmentId 428 specify the language ID (e.g., -1) and the fulfillment ID (e.g., 10051) within commerce area data element 420, customer data element 422, and data area data element 424.

Business object document descriptor GetCustomer.ext 412 contains an XPath query for each element in GetCustomer.xml 406. A business object document descriptor may be associated with the business object documents by name (e.g., same name with .ext extension). A business object document descriptor may contain labels taken from data element names in the business object document. These labels are used to identify each XPath query and are used to set the value of that data element in the business object document during testing. For example, label storeId 430 indicates the XPath query (e.g., GetCustomer/DataArea/Customer/Customer/CommerceArea/StoreId 432) of the store ID element in business object document GetCustomer.xml 406. In this manner, a business object document such as GetCustomer.xml 406 may be captured and stored "as-is", and the mechanism used to parameterize it (i.e., business object document descriptor GetCustomer.ext 412) is stored external to the test script and the business object document itself.

Figure 5:
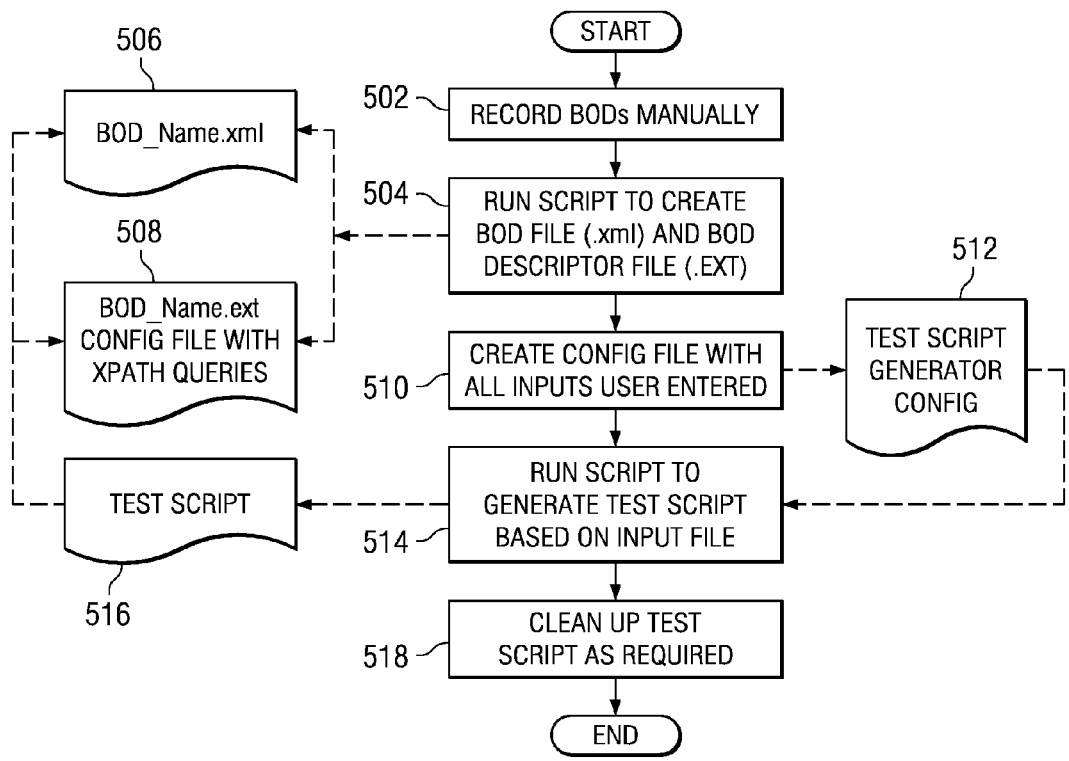
FIG. 5 is a flowchart of a process for stress testing a service oriented architecture based application in accordance with the illustrative embodiments.

FIG. 5 is a flowchart of a process for stress testing a service oriented architecture based application in accordance with the illustrative embodiments. The process described in FIG. 5 may be implemented in a testing environment such as testing environment 300 in FIG. 3. The process begins with manually observing a business process flow to be tested and using the logging facility on the SOA client to record the business object documents sent to the SOA server (step 502). After recording the business object documents, a program, such as business object document extractor tool 310 in FIG. 3, is used to store each recorded business object document in its own file in a common repository, as well as generating a corresponding business object document descriptor file (step 504). The business object document file is represented in XML, and is given a proper name (BOD_name.xml) (step 506). The corresponding business object descriptor file comprises a configuration file with XPath queries, and is given the name of the business object document file but with an .ext extension (BOD_name.ext) (step 508). The descriptors contain labels taken from the element names in the business object document file. These labels are used to identify each XPath query of the elements in the business object document file in order to set the value of those elements during testing.

Next, a configuration file is created which specifies all values entered by the user when recording the business process flow (step 510). The configuration file contains information about the user input parameters. Generally, only a subset of the elements in a business object document is obtained from user input. The remaining elements may be generated by the SOA client or are simply meta information. The configuration file specifies the information the user enters. The configuration file is created by a test script generator, which also maps the configuration file to the proper business object document (step 512).

At this point, the test script generator uses the information in the configuration file to generate a test script comprising test script executor-specific code for the test script executor to test the application (step 514). The created business object document file, business object document descriptor, and configuration file are used as input to the test script. When the test script is run, library functions may be called from the test script to allow information from the test data input files to be inserted into a template business object document at the locations specified by the XPath queries in the corresponding business object descriptor file (step 516). By externalizing business object document file and test data input files from the test script, if the business object document changes, only the business object document file and the XPath queries need to be updated. The test script itself can often remain unchanged. The XPath queries may only need to be changed if the business object document changes structurally or if the name of the parent element of test data changes.

Depending on the business object document file content, some further processing may be required in the test script, so manual checking of test script may be performed (step 518), with the process terminating thereafter. For example, user input may change the values within multiple fields of the configuration file, so the user input may need to be checked and other values may need to be set accordingly. For simple business object documents, the test script created from the test script generator will be usable immediately.

Following this process, we have an almost fully automated process for generating test scripts for SOA based applications. The generated test scripts must still be combined to form full test scenarios, but the majority of the automation work is done. The process is also easily adaptable to changes occurring during the development cycle or between cycles when calibrating regression test assets for a new product release.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for stress testing a service oriented architecture based application, the computer implemented method comprising:
    recording a business process flow;
    extracting an XML document from the recorded business process flow;
    creating an XML document file for the extracted XML document, an XML document descriptor file comprising XPath queries for data elements in the XML document file, a configuration file comprising user input parameters obtained from the recorded business process flow, and a test input data file;
    generating a test script using input of the XML document file, the XML document descriptor file, and the configuration file and inserting data values from the test input data file into a template defined by the XML document file at locations specified by the XPath queries; and
    executing the test script.

2. The computer implemented method of claim 1, further comprising:
    re-recording the business process flow responsive to a change in the business process flow;
    extracting an updated XML document from the re-recorded business process flow;
    creating an updated XML document file from the updated XML document; and
    creating an updated XML document descriptor file responsive to changes in the XML document invalidating at least one of the XPath queries in the XML document descriptor file.

3. The computer implemented method of claim 1, wherein the XML document file, the XML document descriptor file, and the test input data file are created and stored external to the test script.

4. The computer implemented method of claim 3, wherein the XML document file and XML document descriptor file are stored in a common repository.

5. The computer implemented method of claim 1, wherein the XML document and the XML document file conform to a business object document standard.

6. The computer implemented method of claim 1, wherein the XML document descriptor file includes labels comprising names of the data elements in the XML document file.

7. The computer implemented method of claim 6, wherein each of the labels identifies a respective XPath query of the data elements in the XML document file.

8. The computer implemented method of claim 1, wherein a subset of data elements in the XML document are obtained from user input, and remaining data elements are provided by at least one of generation by a client or meta information.

9. A data processing system for stress testing a service oriented architecture based application, the data processing system comprising:
 a bus;
 a storage device connected to the bus, wherein the storage device contains computer usable code;
 at least one managed device connected to the bus;
 a communications unit connected to the bus; and
 a processing unit connected to the bus, wherein the processing unit executes the computer usable code to record a business process flow; extract an XML document from the recorded business process flow; create an XML document file for the extracted XML document, an XML document descriptor file comprising XPath queries for data elements in the XML document file, a configuration file comprising user input parameters obtained from the recorded business process flow, and a test input data file; generate a test script using input of the XML document file, the XML document descriptor file, and the configuration file and inserting data values from the test input data file into a template defined by the XML document file at locations specified by the XPath queries; and execute the test script.

10. The data processing system of claim 9, wherein the processing unit further executes the computer usable code to responsive to a change in the business process flow, re-recording the business process flow;
 extracting an updated XML document from the re-recorded business process flow;
 creating an updated XML document file from the updated XML document; and
 creating an updated XML document descriptor file responsive to changes in the XML document invalidating at least one of the XPath queries in the XML document descriptor file.

11. The data processing system of claim 9, wherein the XML document file, the XML document descriptor file, and the test input data file are created and stored external to the test script.

12. The data processing system of claim 9, wherein the XML document and the XML document file conform to a business object document standard.

13. A computer program product for stress testing a service oriented architecture based application, the computer program product comprising:
 a non-transitory computer readable medium having computer usable program code embodied thereon, the computer usable program code comprising:
 computer usable program code for recording a business process flow;
 computer usable program code for extracting an XML document from the recorded business process flow;
 computer usable program code for creating an XML document file for the extracted XML document, an XML document descriptor file comprising XPath queries for data elements in the XML document file, a configuration file comprising user input parameters obtained from the recorded business process flow, and a test input data file;
 computer usable program code for generating a test script using input of the XML document file, the XML document descriptor file, and the configuration file and inserting data values from the test input data file into a template defined by the XML document file at locations specified by the XPath queries; and
 computer usable program code for executing the test script.

14. The computer program product of claim 13, further comprising:
 computer usable program code for re-recording the business process flow responsive to a change in the business process flow;
 computer usable program code for extracting an updated XML document from the re-recorded business process flow;
 computer usable program code for creating an updated XML document file from the updated XML document; and
 computer usable program code for creating an updated XML document descriptor file responsive to changes in the XML document invalidating at least one of the XPath queries in the XML document descriptor file.

15. The computer program product of claim 13, wherein the XML document file, the XML document descriptor file, and the test input data file are created and stored external to the test script.

16. The computer program product of claim 15, wherein the XML document file and XML document descriptor file are stored in a common repository.

17. The computer program product of claim 13, wherein the XML document and the XML document file conform to a business object document standard.

18. The computer program product of claim 13, wherein the XML document descriptor file includes labels comprising names of the data elements in the XML document file.

19. The computer program product of claim 18, wherein each of the labels identifies a respective XPath query of the data elements in the XML document file.

20. The computer program product of claim 13, wherein a subset of data elements in the XML document are obtained from user input, and remaining data elements are provided by at least one of generation by a client or meta information.

* * * * *